United States Patent
Du et al.

(10) Patent No.: US 10,372,010 B2
(45) Date of Patent: *Aug. 6, 2019

(54) ELECTROPHORETIC DISPLAY FLUID COMPRISING FIVE TYPES OF PARTICLES

(71) Applicant: E Ink California, LLC, Fremont, CA (US)

(72) Inventors: Hui Du, Milpitas, CA (US); Craig Lin, Oakland, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/048,463

(22) Filed: Jul. 30, 2018

(65) Prior Publication Data

US 2018/0335680 A1   Nov. 22, 2018

Related U.S. Application Data

(62) Division of application No. 15/147,536, filed on May 5, 2016, now Pat. No. 10,036,929.

(60) Provisional application No. 62/159,831, filed on May 11, 2015.

(51) Int. Cl.
| | | |
|---|---|---|
| *G02F 1/167* | (2019.01) | |
| *H01B 1/00* | (2006.01) | |
| *H01B 1/12* | (2006.01) | |
| *H01B 1/08* | (2006.01) | |
| *H01B 3/00* | (2006.01) | |
| *C08F 292/00* | (2006.01) | |
| *G02F 1/1675* | (2019.01) | |

(52) U.S. Cl.
CPC ...... *G02F 1/167* (2013.01); *G02F 2001/1678* (2013.01)

(58) Field of Classification Search
CPC .......... G02F 1/00; G02F 1/167; G02F 1/0009; G02F 2001/1678; C08F 292/00; H01B 1/00; H01B 1/12; H01B 1/08; H01B 3/00
USPC .... 252/500, 518.1, 519.33, 519.5, 572, 583; 313/483; 359/238, 296, 321; 525/267, 525/269, 30.3, 340, 353; 526/172, 213
See application file for complete search history.

(56) References Cited

U.S. PATENT DOCUMENTS

| | | |
|---|---|---|
| 6,113,810 A | 9/2000 | Hou |
| 6,822,782 B2 | 11/2004 | Honeyman |
| 6,859,302 B2 | 2/2005 | Liang |
| 6,930,818 B1 | 8/2005 | Liang |
| 6,947,203 B2 | 9/2005 | Kanbe |
| 6,956,690 B2 | 10/2005 | Yu |
| 7,075,502 B1 | 7/2006 | Drzaic |
| 8,031,392 B2 | 10/2011 | Hiji |
| 9,013,516 B2 | 4/2015 | Sakamoto |
| 9,013,783 B2 | 4/2015 | Sprague |
| 9,170,468 B2 | 10/2015 | Lin |
| 9,251,736 B2 | 2/2016 | Lin |
| 9,366,935 B2 | 6/2016 | Du |
| 9,372,380 B2 | 6/2016 | Du |
| 9,382,427 B2 | 7/2016 | Du |
| 9,403,987 B2 | 8/2016 | Hayoz |
| 9,671,668 B2 | 6/2017 | Chan |
| 2008/0062159 A1 | 3/2008 | Roh |
| 2011/0217639 A1 | 9/2011 | Sprague |
| 2011/0286078 A1 | 11/2011 | Yang |
| 2014/0104674 A1 | 4/2014 | Ting |
| 2015/0168797 A1 | 6/2015 | Greinert |
| 2016/0334690 A1 | 11/2016 | Du |

FOREIGN PATENT DOCUMENTS

| | | | |
|---|---|---|---|
| JP | 2007140129 A | 6/2007 | |
| JP | 2010044114 A | 2/2010 | |
| WO | WO-2010149505 A2 * | 12/2010 | ........... C09B 69/008 |
| WO | WO-2014019650 A1 * | 2/2014 | ............ G02F 1/167 |

OTHER PUBLICATIONS

Dongri Chao et al., "Poly(ethylene oxide) Macromonomers IX. Synthesis and Polymerization of Macromonomers Carrying Styryl End Groups with Enhanced Hydrophobicity", Polymer Journal 1991, vol. 23, No. 9, pp. 1045-1052.
Koichi Ito et al., "Poly(ethylene oxide) Macromonomers. 7. Micellar Polymerization in Water", Macromolecules 1991, vol. 24, No. 9, pp. 2348-2354.
Seigou Kawaguchi et al., "Synthesis of polyethylene macromonomers and their radical copolymerizations with methyl methacrylate in homogeneous and oligoethylene melts media" Designed Monomers and Polymers 2000, vol. 3, No. 3, p. 263-277.
Federal Institute of Industrial Property, PCT/US2016/030931, "International Search Report and Written Opinion", Russian Federation, dated Aug. 18, 2016.
European Search Report, PCT/US2016/030931, Extended European Search Report, dated Jan. 11, 2019.

* cited by examiner

*Primary Examiner* — Bijan Ahvazi

(74) *Attorney, Agent, or Firm* — Ioannis Constantinides

(57) ABSTRACT

The present invention is directed to an electrophoretic fluid comprising five different types of particles, wherein each type of particle has a different color and the first, second, and third types of particles carry the same charge polarity.

10 Claims, No Drawings

ELECTROPHORETIC DISPLAY FLUID COMPRISING FIVE TYPES OF PARTICLES

RELATED APPLICATIONS

This application is a divisional of U.S. patent application Ser. No. 15/147,536, filed May 5, 2016, now U.S. Pat. No. 10,036,929, which claims the benefit of U.S. Provisional Application No. 62/159,831, filed May 11, 2015. All patents and applications referenced herein are incorporated by reference in their entireties.

FIELD OF THE INVENTION

The present invention is directed to an electrophoretic display fluid and an electrophoretic device utilizing such a display fluid.

BACKGROUND OF THE INVENTION

An electrophoretic display (EPD) is a non-emissive device based on the electrophoresis phenomenon influencing charged pigment particles dispersed in a dielectric solvent. An EPD typically comprises a pair of spaced-apart plate-like electrodes. At least one of the electrode plates, typically on the viewing side, is transparent. An electrophoretic fluid composed of a dielectric solvent with charged pigment particles dispersed therein is enclosed between the two electrode plates.

An electrophoretic fluid may comprise one or more types of charged particles. For a color electrophoretic display device, a fluid usually comprises at least three types of charged particles. Among them, there are white, black and non-white and non-black particles. For the non-white and non-black particles, organic pigments are often used due to their superior coloring strength.

But in practice, there are only a few types of surface modification technique that can be used to prepare organic pigment particles to allow them to be functional in an electrophoretic display. If organic pigment particles of different colors coexist in a fluid and they have the same surface chemistry, these particles may be difficult to be separated under a given driving voltage. This Is due to the fact that it is difficult to prepare these particles to have desired charge polarities and different levels of charge potential since they have the same surface chemistry.

Furthermore, if charge control agent(s) is/are used in a fluid, the different colored organic pigment particles having the same surface chemistry would compete for the same charge control agent, resulting in unstable charges during driving. All of these factors could lead to poor color performance of a display device, such as presence of color tinting and poor color contrast.

DETAILED DESCRIPTION OF THE INVENTION

In the present invention, inorganic color pigments are used to replace at least one of the organic color pigments in an electrophoretic fluid that comprises two or more types of non-white and non-black particles.

A first aspect of the present invention is directed to an electrophoretic fluid comprising at least two types of charged particles dispersed in a solvent or solvent mixture, wherein:

(i) one type of particles which is non-white and non-black and formed from an inorganic pigment, (ii) another type of particles which is non-white and non-black and formed from an organic pigment, and both types of particles are of different colors and carry the same charge polarity.

In one embodiment, the fluid comprises one additional type of different colored particles (i.e., total of three types). In one embodiment, the fluid comprises two additional types of different colored particles (i.e., total of four types). In one embodiment, the fluid comprises three additional types of different colored particles (i.e., total of five types). In one embodiment, the fluid comprises more than five types of different colored particles.

In one embodiment, both types of particles (i) and (ii) are positively charged. In one embodiment, the two types of particles have different types of surface chemistry.

In one embodiment, the type of particles (i) carries a higher charge than the type of particles (ii).

In one embodiment, the fluid comprises an additional type of the same charged particles which is black or white. In this embodiment, the three types of particles are positively charged. In one embodiment, the additional type of the same charged particles is of a black color. In a further embodiment, the three types of particles carry different levels of charge potential. In yet a further embodiment, the magnitudes of the type of particles of (i) and the type of particles of (ii) are progressively lower than that of the additional type of the same charged particles. In other words, the additional type of the same charged particles carries the highest charge potential; the type of particles of (ii) carries the lowest charge potential; and the charge magnitude of the type of particles of (i) is between those of the additional type of the same charged particles and the type of particles of (ii).

In one embodiment, the fluid further comprises other types of particles which are oppositely charged. In one embodiment, the other types of particles are negatively charged.

A second aspect of the present invention is directed to an electrophoretic fluid comprising a first type of particles, a second type of particles, a third type of particles, a fourth type of particles and a fifth type of particles, all of which are dispersed in a solvent or solvent mixture, wherein:

(a) the five types of particles are of colors differing from one another;

(b) the first, second and third types of particles carry the same charge polarity, (c) the second type of particles is non-white and non-black and formed of inorganic pigment and the third type of particles is non-white and non-black and formed of an organic pigment;

(d) the fourth and fifth types of particles carry a charge which is opposite of that carried by the first, second and third types of particles.

In one embodiment, the first, second and third types of particles are positively charged. In one embodiment, the first type of particles is black. In one embodiment, the second type and third type of particles have progressively lower magnitudes than that of the first type of particles. In other words, the first type of particles are highest charged, the third type of particles are lowest charged, and the charge magnitude of the second type of particles is between those of the first and third types of particles.

In one embodiment, the second type of particles carries a higher charge than the third type of particles.

In one embodiment, the fourth and fifth types of particles are negatively charged. In one embodiment, the magnitude of the fifth type of particles magnitude is lower than that of the fourth type of particles.

In addition to the colors, it is possible that the multiple types of particles have other distinct optical characteristics, such as optical transmission, reflectance, luminescence or, in the case of displays intended for machine reading, pseudo-color in the sense of a change in reflectance of electromagnetic wavelengths outside the visible range.

The charge potentials of the particles may be measured in terms of zeta potential. In one embodiment, the zeta potential is determined by Colloidal Dynamics AcoustoSizer IIM with a CSPU-100 signal processing unit, ESA EN# Attn flow through cell (K:127). The instrument constants, such as density of the solvent used in the sample, dielectric constant of the solvent, speed of sound in the solvent, viscosity of the solvent, all of which at the testing temperature (25° C.) are entered before testing. Pigment samples are dispersed in the solvent (which is usually a hydrocarbon fluid having less than 12 carbon atoms), and diluted to be 5-10% by weight. The sample also contains a charge control agent (Solsperse 17000®, available from Lubrizol Corporation, a Berkshire Hathaway company; "Solsperse" is a Registered Trade Mark), with a weight ratio of 1:10 of the charge control agent to the particles. The mass of the diluted sample is determined and the sample is then loaded into the flow through cell for determination of the zeta potential.

For the non-white and non-black organic pigments, they may include, but are not limited to, CI pigment PR 254, PR122, PR149, PG36, PG58, PG7, PB15:3, PY83, PY138, PY150, PY155 or PY20. Those are commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV Fast Red D3G, Hostaperm Red D3G 70, Hostaperm Blue B2G-EDS, Hostaperm Yellow H4G-EDS, F2G-EDS, Novoperm Yellow HR-70-EDS, Hostaperm Green GNX, BASF Irgazine Red L 3630, Cinquasia Red L 4100 HD, and Irgazin Red L 3660 HD; Sun Chemical phthalocyanine blue, phthalocyanine green, diarylide yellow or diarylide AAOT yellow.

For the non-white and non-black inorganic pigments, they may include, but are not limited to, mixed metal oxides pigments, usually produced by high temperature calcination process, such as CI (color index) pigment blue 36 or 28 (PB36 or PB28), CI pigment yellow 227 or 53, CI pigment green 50 or 26, CI pigment red 102, and the like.

The solvent in which the pigment particles are dispersed has a dielectric constant in the range of about 2 to about 30, preferably about 2 to about 15 for high particle mobility. Examples of suitable dielectric solvent include hydrocarbons such as Isopar, decahydronaphthalene (DECALIN), 5-ethylidene-2-norbornene, fatty oils, paraffin oil; silicon fluids; aromatic hydrocarbons such as toluene, xylene, phenylxylylethane, dodecylbenzene and alkylnaphthalene; halogenated solvents such as perfluorodecalin, perfluorotoluene, perfluoroxylene, dichlorobenzotrifluoride, 3,4,5-trichlorobenzotrifluoride, chloropentafluoro-benzene, dichlorononane, pentachlorobenzene; and perfluorinated solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del., polydimethylsiloxane based silicone oil from Dow-corning (DC-200).

The particles (organic and inorganic) may exhibit a native charge, or may be charged explicitly using a charge control agent, or may acquire a charge when suspended in a solvent or solvent mixture.

Suitable charge control agents are well known in the art; they may be polymeric or non-polymeric in nature or may be ionic or non-ionic. Examples of charge control agent may include, but are not limited to, Solsperse 17000 (active polymeric dispersant), Solsperse 19000, Solsperse 9000 (active polymeric dispersant), OLOA 11000 (succinimide ashless dispersant), Unithox 750 (ethoxylates), Span 85 (sorbitan trioleate), Petronate L (sodium sulfonate), Alcolec LV30 (soy lecithin), Petrostep B100 (petroleum sulfonate), B70 (barium sulfonate), Aerosol OT, polyisobutylene derivatives, poly(ethylene co-butylene) derivatives, or the like.

The following provides a few methods which may be used to modify the surface of the particles of the present invention.

I. Surface Modification Methods:

One type of surface modification methods is surface grafting. For pigments that have hydroxyl (—OH) functionalities on the surface, organic silane coupling agents may be used to react with the hydroxyl functionalities, through which, molecules with polymerizable functional groups can be chemically bonded to the pigment surface. The surface polymerization will then be carried out to graft polymers onto the surface of the pigment particles.

Inorganic pigment usually goes through this method since there are hydroxyl (—OH) functionalities on metal oxide surface by nature. But this method may be applicable to organic pigment as well, if the organic pigments have hydroxyl (—OH) functionalities.

This type of chemistry and method are described in U.S. Pat. No. 6,822,782, the content of which is incorporated herein by reference in its entirety.

I(a) Free Radical Random Graft Polymerization (RGP) Method

This method is more suitable for the inorganic pigment. In it, a particle is first reacted with a reagent having a functional group and a polymerizable group wherein the functional group is capable of reacting with, and bonding to, the particle surface. The functional group reacts with the particle surface, leaving the polymerizable group covalently bonded to the particle surface and free to participate in a subsequent polymerization reaction. The particle carrying the polymerizable group is then treated with one or more polymerizable monomers or oligomers under conditions effective to cause reaction between the polymerizable group on the particles and the monomer(s) or oligomer(s); such conditions typically include the presence of a polymerization initiator, although in some cases the polymerization may be initiated thermally, with no initiator present.

The polymerization reaction produces polymer chains which include at least one residue from a polymerizable group previously attached to the particle. If multiple polymerizable groups are attached to the particle in the first stage of the process, the residues of two or more of these polymerizable groups may be incorporated into the same polymer chain, which will thus be attached to the particle surface at two or more points.

It is believed that the presence of multiply-attached polymer chains is especially advantageous for stabilizing particles used in an electrophoretic fluid. The polymer chains do not completely cover the surface of the particle. The incomplete coverage of the surfaces of the pigment particles by the polymer chains is important in providing particles with good electrophoretic properties.

I(b) Ionic Random Grafting Polymerization (Ionic RGP) Method

Alternatively, the polymerizable group may be attached to the particle via an ionic bond. Depending upon the chemical nature of the particle, in some cases, it may be possible to simply react a monomer with the particle to form the required ionic bond. However, in most cases, it will be necessary to pretreat the particle with a bi-functional reagent having one functional group capable of reacting with, and bonding to, the particle and a second functional group which can form the necessary ionic bond. Thereafter, the resultant particle is reacted with a monomer having a polymerizable group and a third functional group capable of reacting with the second functional group to form the desired ionic bond. The final polymerization step of the RGP process is then carried out as previously described to produce the product. The ionic bond forming reaction is typically an acid-base reaction; for example, the second functional group may be an ammonium group, such as an alkyl-substituted ammonium group, and the third functional group be a sulfonic acid, or vice versa.

The ionic-RGP process which is also more suitable for the inorganic pigment has the advantage that some of the ionically-bonded polymer chains in the final particles can detach and become dispersed in the suspending fluid of the electrophoretic fluid, thus providing stabilized counterions to the charged particles. In effect, the ionically-bonded polymer functions as both stabilizing polymer and charge control agent for the particles.

I(c) Atom Transfer Radical Polymerization (ATRP) Method

Further alternatively, a group capable of initiating polymerization may first be attached to the pigment particle, and a polymer formed from this initiating group. The initiating group may be attached to the polymer surface by a covalent or an ionic bond in any of the ways previously described. In the first stage of this process, the surface of a particle is treated with a bi-functional reagent having one group capable of reacting with the particle surface and a second group which provides an initiating site for atom transfer radical polymerization (ATRP). The ATRP initiator site may be, for example, a benzylic chloride or other halogen atom. The resultant particle is then treated with an atom transfer radical polymerizable monomer (e.g., methyl methacrylate) to form a polymer on the particle surface. The ATRP has the advantage that the polymerization reaction with a first monomer can be stopped by cooling the reaction mixture, the first monomer replaced by a second monomer, and the reaction thereafter restarted by increasing the temperature of the reaction mixture to cause polymerization of the second monomer on to the ends of the previously-formed polymer of the first monomer. These steps may be repeated with an introduction of a third monomer. This process forms on the particle a block copolymer of the two (or more) monomers.

The method is not restricted to the use of ATRP initiating sites on the particle, but also includes the use of other types of initiating sites, for example, ionic or free radical initiating sites. Also, the bi-functional reagents mentioned above need not be single monomeric reagents but can themselves be polymeric.

The ATRP method is also more suitable for the inorganic pigment.

The methods in this section may include more than one stage and/or more than one type of polymerization. For example, the particle is first subjected to the free radical polymerization method described above, except that a mixture of monomers is used including at least one monomer (for example, a chloromethylstyrene) which contains a group providing an initiating site for ATRP. Thus, there is formed on the particle a polymer chain which contains ATRP initiating sites. After the free radical polymerization is concluded, the particle is then subjected to ATRP, so that polymer side chains are formed from the ATRP initiating sites, thus producing a "hyperbranched" polymer having main chains formed by the RGP process and side chains formed by ATRP. It has been found that this type of polymer structure is highly advantageous in stabilizing a suspension of charged particles in a non-ionic fluid medium typically used as suspending fluids in electrophoretic displays. A similar type of hyperbranched polymer could be produced by including in the mixture of monomers used in the RGP step a monomer which contains an initiating group for stable free radical polymerization (SFRP), this SFRP initiating group being chosen so that it essentially does not initiate polymerization under the conditions used in the RGP step. After the RGP step is concluded, the particles are then subjected to SFRP to produce the hyperbranched polymer.

In addition, polymerizable groups and initiators may be attached to the surface of the particles using any bi-functional reagents having one group capable of bonding, covalently or ionically, to the surface, and a second group providing the required polymerizable or initiating functionality. The independent functioning of the two groups has the advantage of providing great flexibility in adapting the methods to a different type of particle, while keeping the same polymerizable or initiating functionality, so that the later stages of the processes will need few, if any, changes, as a result of changing the type of particle being coated.

In describing the reagents used to provide the desired polymerizable or initiating functionality as "bi-functional", the reagents may contain more than one group of each type, and indeed in some cases it may be desirable to provide more than one group of one or both types. For example, polymerization initiators are known (such as 4,4'-azobis(4-cyanovaleric acid)) having more than one ionic site, and such initiators may be used in the method. Also, the bi-functional reagent may have the form of a polymer containing repeating units having the capacity to bond to the particle surface and other repeated units having the desired polymerizable or initiating functionality, and such polymeric bi-functional reagents will normally contain multiple repeating units of both these types.

The polymerizable and initiating groups used may be any of those known in the art, provided that the relevant groups are compatible with the reactions used to attach them to the particle surface. Many examples are given in U.S. Pat. No. 6,822,782.

In general, the particles prepared from the surface grafting methods discussed above have about 1 to about 15% by weight of a polymer chemically bonded to, or cross-linked around, the particle surface. The pigment surface is attached with hairy polymer chains. The polymer chains are partially or completely dissolved in the electrophoretic fluid.

II. Alternative Surface Modification Methods:

Another type of surface modification methods produce particles which have one or more core particles encapsulated within polymer shells or matrix. The polymer shells or matrix are not soluble in the electrophoretic fluid. There are polymer chains on the encapsulated particles acts as stabilizer to help the particle dispersible in an electrophoretic fluid. The polymer chains are soluble in the fluid.

The polymer matrix and stabilizer have no chemical bonding with raw pigment surface. They can be washed off with a suitable solvent. The polymer content can be in the range of 10-80% by weight.

Usually organic pigments can be modified through the encapsulation method, since they generally have crystalline structure with a surface that is very difficult to chemically bond extra molecules. Surface grafting is a significant challenge for organic pigments because it may destroy the chromophores and change the color of the pigments.

The methods are described in US Publication Numbers 2012-0199798 and 2013-0175479, the contents of which are incorporated herein by reference in their entirety.

The core particles may be any of those, organic or inorganic pigments, described above.

The core particles may be optionally surface treated. The surface treatment would improve compatibility of the core pigment particles to the monomer in a reaction medium or chemical bonding with the monomer, in forming the final particles. As an example, the surface treatment may be carried out with an organic silane having functional groups, such as acrylate, vinyl, $-NH_2$, $-NCO$, $-OH$ or the like. These functional groups may undergo chemical reaction with the monomers. Other organic materials can be used to pre-treat the pigment include polymers or oligomers that act as dispersant, such as polyacrylate, polyurethane, polyurea, polyethylene, polyester, polysiloxane or the like.

The surface treatment can also come from inorganic materials including silica, aluminum oxide, zinc oxide and the like or a combination thereof. Sodium silicate or tetraethoxysilane may be used as a common precursor for silica coating.

Furthermore, the surface treatment may optionally have functional groups that would enable charge generation or interaction with a charge control agent.

The core particle(s) and the surface treatment materials should behave as one single unit. Then the core particles will be encapsulated with polymers through the following processes.

II(a) Dispersion Polymerization Method

In either case, inorganic or organic core particles, the final particles may be formed by this method. During dispersion polymerization, monomer is polymerized around core pigment particles. The solvent selected as the reaction medium must be a good solvent for both the monomer and the polymer chains formed, but a non-solvent for the polymer shell being formed. For example, in an aliphatic hydrocarbon solvent of Isopar G®, monomer methylmethacrylate is soluble; but after polymerization, the resulting polymethylmethacrylate is not soluble.

The polymer shell must be completely incompatible or relatively incompatible with the solvent in which the final particles are dispersed. Suitable monomers may be those described above, such as styrene, methyl acrylate, methyl methacrylate, n-butyl acrylate, n-butyl methacrylate, t-butyl acrylate, t-butyl methacrylate, vinyl pyridine, n-vinyl pyrrolidone, 2-hydroxyethyl acrylate, 2-hydroxyethyl methacrylate, dimethylaminoethyl methacrylate or the like.

To incorporate functional groups for charge generation, a co-monomer may be added in the reaction medium. The co-monomer may either directly charge the composite pigment particles or have interaction with a charge control agent in the display fluid to bring a desired charge polarity and charge density to the composite pigment particles. Suitable co-monomers may include vinylbenzylaminoethylamino-propyl-trimethoxysilane, methacryloxypropyltrimethoxysilane, acrylic acid, methacrylic acid, vinyl phosphoric acid, 2-acrylamino-2-methylpropane sulfonic acid, 2-(dimethylamino)ethyl methacrylate, N-[3-(dimethylamino)propyl]methacrylamide and the like.

The polymer chains on the surface of the particles are usually formed of high molecular weight polymers, such as polyethylene, polypropylene, polyester, polysiloxane or a mixture thereof. The polymer chain facilitates and stabilizes the dispersion of the particles in a solvent.

The polymer chain may be a reactive and polymerizable macromonomer which adsorbs, becomes incorporated or is chemically bonded onto the surface of the polymer shell being formed. The macromonomer as a polymer chain, determines the particle size and colloidal stability of the system.

The macromonomer may be an acrylate-terminated or vinyl-terminated macromolecule, which are suitable because the acrylate or vinyl group can co-polymerize with the monomer in the reaction medium.

The macromonomer preferably has a long tail, R, which may stabilize the final particles in a hydrocarbon solvent.

One type of macromonomers is acrylate terminated polysiloxane (Gelest, MCR-M11, MCR-M17, MCR-M22), as shown below:

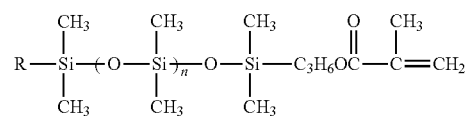

Another type of macromonomers which is suitable for the process is PE-PEO macromonomers, as shown below:

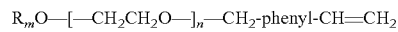

or

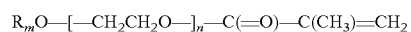

The substituent R may be a polyethylene chain, n is 1-60 and m is 1-500. The synthesis of these compounds may be found in Dongri Chao et al., Polymer Journal, Vol. 23, no. 9, 1045 (1991) and Koichi Ito et al, Macromolecules, 1991, 24, 2348.

Another type of suitable macromonomers is PE macromonomers, as shown below:

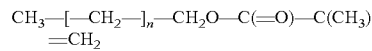

The n, in this case, is 30-100. The synthesis of this type of macromonomers may be found in Seigou Kawaguchi et al, Designed Monomers and Polymers, 2000, 3, 263.

II(b) Living Radical Dispersion Polymerization Method

Alternatively, the particles may be prepared by living radical dispersion polymerization. This method may be applied to both organic and inorganic pigments; but may be more suitable for the organic pigment.

The living radical dispersion polymerization technique is similar to the dispersion polymerization described above by starting the process with pigment particles and monomer dispersed in a reaction medium.

The monomers used in the process to form the shell may include styrene, methyl acrylate, methyl methacrylate, n-butyl acrylate, n-butyl methacrylate, t-butyl acrylate, t-butyl methacrylate, vinyl pyridine, n-vinyl pyrrolidone, 2-hydroxyethyl acrylate, 2-hydroxyethyl methacrylate, dimethylaminoethyl methacrylate and the like.

However in this alternative process, multiple living ends are formed on the surface of the shell. The living ends may be created by adding an agent such as TEMPO (2,2,6,6-tetramethyl-1-piperidinyloxy), a RAFT (reversible addition-fragmentation chain transfer) reagent or the like, in the reaction medium, for the living radical polymerization.

In a further step, a second monomer is added to the reaction medium to cause the living ends to react with the second monomer to form the polymer chains. The second monomer may be lauryl acrylate, lauryl methacrylate, 2-ethylhexyl acrylate, 2-ethylhexyl methacrylate, hexyl acrylate, hexyl methacrylate, n-octyl acrylate, n-octyl methacrylate, n-octadecyl acrylate, n-octadecyl methacrylate or the like.

The polymer chains should be compatible with the solvent in which the particles are dispersed to facilitate dispersion of the particles in the solvent.

Monomers for the polymer chains may be a mixture of hydroxyethyl methacrylate and other acrylate that are compatible to the non-polar solvent, such as lauryl acrylate, lauryl methacrylate, 2-ethylhexyl acrylate, 2-ethylhexyl methacrylate, hexyl acrylate, hexyl methacrylate, n-octyl acrylate, n-octyl methacrylate, n-octadecyl acrylate, n-octadecyl methacrylate or the like.

The advantages of the present invention include color saturation and the color brightness, which may be measured by the L*a*b* color system. It was found surprisingly that an electrophoretic fluid with the organic color (non-white and non-black) particles carrying a certain level of charge potential, and the inorganic color (also non-white and non-black) particles carrying the same charge polarity, can show much better color performance than an electrophoretic fluid with two types of same charged organic color particles coexisting in an electrophoretic fluid. Moreover, the system of the present invention allows the two color states to be switched with a shorter waveform, leading to a higher switching speed.

Since inorganic and organic pigments in the system of the present invention have different surface modification chemistries, separation of organic color pigment from inorganic color pigment is much easier. This enables more saturated color state and higher contrast ratio.

EXAMPLE

In an experiment carried out by the inventors, an electrophoretic fluid had multiple types of charged particles of different colors. Among the multiple types of charged particles, the red and blue particles were positively charged.

In sample A, both the red and blue particles were formed from organic pigments (i.e., PR254 and PB15, respectively) and surface treated with the same method, i.e., dispersion polymerization.

In sample B, the red particles were formed of an organic pigment (i.e., PR254) and surface treated by dispersion polymerization while the blue particles were formed of an inorganic pigment (i.e., PB28) and surface treated by the free radical polymerization method.

When these two samples were driven to different color states, and it was found that sample A could not display the red color state because the organic red particles and the organic blue particles competed for the same charge control agent, Solsperse 17K, in the fluid, and the two types of particles could not be adequately separated. In contrast, sample B did not have such a problem and was able to display the red and blue colors with good color saturation and brightness.

The electrophoretic fluid of the present invention is filled in display cells. The display cells may be cup-like microcells as described in U.S. Pat. No. 6,930,818, the content of which is incorporated herein by reference in its entirety. The display cells may also be other types of micro-containers, such as microcapsules, micro-channels or equivalents, regardless of their shapes or sizes. All of these are within the scope of the present application.

While the present invention has been described with reference to the specific embodiments thereof, it should be understood by those skilled in the art that various changes may be made and equivalents may be substituted without departing from the scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. An electrophoretic fluid comprising a first type of particles, a second type of particles, a third type of particles, a fourth type of particles, and a fifth type of particles, all of which are dispersed in a solvent or solvent mixture, wherein:
   (a) the five types of particles are of colors differing from one another;
   (b) the first, second and third types of particles carry the same charge polarity;
   (c) the first type of particles is black in color, the second type of particles is non-white and non-black and formed of inorganic pigment, and the third type of particles is non-white and non-black and formed of an organic pigment, wherein the second and third types of particles are differently colored and have different surface chemistry, and wherein the first, second, and third types of particles carry different magnitudes of charge from each other;
   (d) the fourth and fifth types of particles carry a charge opposite to that carried by the first, second and third types of particles, wherein at least one type of particle includes a surface treatment.

2. The fluid of claim 1, wherein the first, second and third types of particles are positively charged.

3. The fluid of claim 1, wherein the second type of particles carries a higher charge than the third type of particles.

4. The fluid of claim 1, wherein the first type of particles is the highest charged, the third type of particles is the lowest charged and the second type of particles has a charge magnitude between those of the first and third types of particles.

5. The fluid of claim 4, wherein the fourth and fifth types of particles are negatively charged.

6. The fluid of claim 5, wherein the magnitude of the fifth type of particles magnitude is lower than that of the fourth type of particles.

7. The fluid of claim 1, wherein the fourth and fifth types of particles are negatively charged.

8. The fluid of claim 1, wherein the magnitude of the fifth type of particles magnitude is lower than that of the fourth type of particles.

9. The fluid of claim 1, wherein at least one type of particle comprises a mixed metal oxide.

10. The fluid of claim 1, wherein the surface treatment includes an organic silane having a functional group selected from acrylate, vinyl, $-NH_2$, $-NCO$, and $-OH$.

* * * * *